Patented Sept. 18, 1951

2,568,119

UNITED STATES PATENT OFFICE 2,568,119

PHENOLIC RESINS CONTAINING ISANIC ACID

Melvin De Groote, University City, and Bernhard Keiser, Webster Groves, Mo., assignors to Petrolite Corporation, Ltd., Wilmington, Del., a corporation of Delaware No Drawing. Application February 13, 1950, Serial No. 144,033

3 Claims. (Cl. 260—19)

This invention relates to certain resins or resinous products which are particularly valuable as starting materials or intermediates for subsequent reaction with reagents, such as alkylene oxides, epichlorohydrin, ethylene imine, etc. Reference is made to our co-pending application Serial No. 144,032, filed February 13, 1950. In this particular co-pending application we have described the oxyalkylated derivatives of the herein specified resins. Such oxyalkylated derivatives are obtained by means of reaction with ethylene oxide, propylene oxide, glycide, methylglycide, or the like.

In our co-pending application Serial No. 144,031, filed February 13, 1950, we have described the use of the oxyalkylated derivatives, referred to in the preceding paragraph, for breaking petroleum emulsions of the water-in-oil type, and particularly oil field emulsions.

Reference is made to our two co-pending applications Serial Nos. 59,768 and 59,767, both filed November 12, 1948, the former of which is now Patent 2,560,333, issued July 10, 1951. The first of the aforementioned co-pending applications is concerned with a process for breaking petroleum emulsions of the water-in-oil type, characterized by subjecting the emulsion to the action of a demulsifier including hydrophile synthetic products; said hydrophile synthetic products being oxyalkylation products of (A) An alpha-beta alkylene oxide having not more than 4 carbon atoms and selected from the class consisting of ethylene oxide, propylene oxide, butylene oxide, glycide and methylglycide; and (B) An oxyalkylation-susceptible, fusible, organic solvent-soluble, water-insoluble, phenolic resin; said resin being derived, at least in part, by reaction with an acetylenic hydrocarbon so as to introduce an altered acetylenic radical as the linking structure between phenolic nuclei; said oxyalkylated resin being characterized by the introduction into the resin molecule of a plurality of divalent radicals having the formula $(R_1O)_{n'}$ in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

The second of the aforementioned co-pending applications is concerned with the oxyalkylated resins referred to immediately preceding as new compounds or compositions of matter and not specifically limited to their use in demulsification.

The present invention is concerned with certain resins which involve in their manufacture a phenol, an acetylenic reactant, and an aldehyde, such as formaldehyde. In light of what will be said hereinafter, however, one cannot necessarily predict as to whether or not the acetylenic reactant necessarily forms a phenolic resin of the same type as acetylene. The acetylenic reactant employed is a fatty acid which contains, among other things, an acetylenic linkage. This fatty acid is derived from a vegetable oil, which, in turn, is derived from an African nut. The nut is known as Isano nut, or Boleko nut. It also is known by other terms. These nuts, or similar nuts which are conveniently included in the same designation, have been shipped into Europe for the last several years or longer, and the oil derived therefrom has been used as drying oil.

The exact nature of the fatty acids which are present as glycerols in Isano nuts, Boleko nuts, or similar nuts (Ongueko, or Ongoké) is not known. Such nut-bearing trees or shrubs occur in the French and Belgian Congo and apparently belong to what botanists describe as Olimiae, botanically known as Onguekoa Gore Engler or also as Ongokea Klaineana.

For a brief and authoritative examination of the literature in this regard, see Ralston, "Fatty Acids and Their Derivatives," John Wiley & Sons, Inc., New York, 1948, Steger and Van Loon (Fette U. Seifen, 44, 243 (1937)), identified the fatty acid as being either 6-octadecen-9-ynoic acid or 9-octadecen-6-ynoic acid. Subsequently, Castille (Ann., 543, 104 (1940)), concluded that a similar acid which he termed erythrogenic acid was represented by either of the following two formulae:

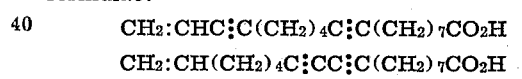

Subsequently, Steger and Van Loon (Rec. trav. chim., 59, 1156 (1940)), named this acid "isamic" acid.

Since the composition of this material is still a matter for further examination, we are using the term "isanic" acid to mean the fatty acid obtained by the saponification of any of the above indicated fatty esters, with the understanding that such acid contain at least one acetylenic linkage, and in addition to such acetylenic linkage, is probably more highly unsaturated, due to either the presence of one or more additional acetylenic linkages, or one or more double bonds.

Others have referred to this same acid apparently as Boleko nut oil fatty acid. We are using the term isanic acid as synonymous with this same terminology.

Attention is directed also to what is said as to the similarity or the equivalency of these three oils in Lewkowitsch, J., "Chemical Technology and Analysis of Oils, Fats and Waxes," volume II, 6th edition, pp. 159–60, MacMillan & Co., Ltd., New York, 1921; see also what is said in regard to isanic acid, idem, volume I, page 214. Presumably, "isamic" acid and "isanic" acid are the same.

See also what is said by Bergmann in "The Chemistry of Acetylene and Related Compounds," p. 103, Interscience Publishers, Inc., New York, 1948.

As previously noted, we have obtained these nuts, which are suggestive of a large filbert, cracked and ground them in the customary manner, expressed as much oil as we could under pressure, and then extracted with xylene by refluxing under a condenser. We subsequently evaporated the xylene, mixed together the oil obtained by expressing and extracting, clarified it by filtering through fuller's earth, and then saponified it with caustic soda. We made a solution of the soap or salt so obtained and then liberated the free fatty acids by use of dilute hydrochloric acid. These acids, which, as previously stated, will be referred to as isanic acid, have been employed in the subsequent preparations.

More specifically, the present invention is concerned with an oxyalkylation-susceptible, fusible, organic solvent-soluble, water-insoluble phenol-isamic acid-formaldehyde resin; said resin being derived by a reaction involving approximately two moles of a difunctional phenol, one mole of isanic acid, and one-fourth to one-half mole of formaldehyde; said resin being formed in the substantial absence of trifunctional phenols; said phenol being of the formula:

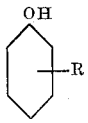

in which R is a hydrocarbon radical having at least 4 and not more than 14 carbon atoms and substituted in the 2, 4, 6 position.

Based on actual acid value of the Boleko oil fatty acid obtained by us, we have used a molecular weight for the fatty acid of 288, although it is understood that this value is not intended to represent any different structure than what was said previously. There may have been present some non-saponifiable material.

*Example 1a*

150 grams of Boleko nut oil fatty acid (isanic acid) and 172 grams of para-tertiary amylphenol were reacted in a resin pot. The equipment used was a conventional two-piece laboratory resin pot. The cover part of the equipment had four openings: One for reflux condenser; one for the stirring device; one for a separatory funnel or other means of adding reactants; and a thermometer well. In the manipulation employed, the separatory funnel insert for adding reactants was not used. The device was equipped with a combination reflux and water-trap apparatus, so that the single piece of apparatus could be used as either a reflux condenser or a water trap, depending upon the position of the three-way glass stop-cock. This permitted convenient withdrawal of water from the water trap. The equipment, furthermore, permitted any setting of the valve without disconnecting the equipment. The resin pot was heated with a glass fibre electrical heater constructed to fit snugly around the resin pot. Such heaters, with regulators, are readily available.

To the above mixture of two reactants there was added 15 grams of zinc acetate as a catalyst. The mixture was stirred for 16 hours at 180°–190° C., and then stirred for 8 hours at 210°–215° C. At the end of this time tests for unreacted amylphenol showed there was only a small amount, or mere trace, present. At this point the reaction mass was allowed to cool to approximately 100° C., and then an amount of xylene equal in weight to the reaction mass, approximately 225 grams, was added. When solution was complete, the mixture was removed from the reaction flask and filtered, and then returned to the flask for further reaction with formaldehyde. There were also added 3½ grams of concentrated hydrochloric acid and 1½ grams of monoalkyl ($C_{10}$–$C_{20}$, principally $C_{12}$–$C_{14}$) benzene monosulfonic acid sodium salt. We are not convinced that one need add any more acid catalyst, for the reason that apparently enough zinc acetate or acetic acid stays behind from the previous reaction to act as a catalyst, but since this practice had been uniformly satisfactory in the manufacture of a large variety of resins, it was followed in this instance purely as a precautionary measure.

In the final step, then, the previously formed resin, the catalyst, solvent, etc., were heated to about 80°–85° C., at which point 44 grams of formaldehyde were run in and the temperature raised to approximately 100° C., or slightly higher. The reaction mixture was then permitted to reflux at 100°–105° C., for one-half to two hours. The reflux trap arrangement was then changed from the reflux position to the normal water entrapment position. The uncombined formaldehyde, the water solution and the water of reaction were permitted to distil out and collect in the trap. As the water distilled out the temperature gradually increased to that determined by the boiling point of xylene, to wit, about 150° C. The water was removed in about 1½ hours. An examination of the aqueous solution obtained in the trap showed that considerable formaldehyde was present, i. e., although only one-half mole or less of formaldehyde had been added for each mole of Boleko oil fatty acids and each two moles of amylphenol, yet only a fraction of this formaldehyde had been employed for reaction. Examination showed that the amount used in reaction was approximately one-half the amount added, or somewhat greater, i. e., one-fourth mole or thereabouts, the obvious range being from a quarter of a mole up to a half mole. The final product was a resinous material suggestive of a very viscous, resinous liquid, or a tacky solid, dark red or blackish red in color. This applied to the appearance of the solvent-free material.

No effort is made to speculate as to the composition of this resin. Attention is directed again to our two aforementioned co-pending applications Serial Nos. 59,767 and 59,768, both filed November 12, 1948, in which there is a discussion of the chemistry involved in the formation of resins from phenols and acetylene. It is possible that this is the primary reaction involved in the initial stage of resinification. On the other hand, it is well known that phenols will combine under appropriate conditions with unsaturated compounds other than acetylene compounds. It may be that isanic acid contains ethylenic linkages, as well as acetylenic linkages and this combination may take place at this point.

| Ex. No. | Phenol Used | Amt. | Boleko Nut Fatty Acid | Zinc Acetate | Formaldehyde | HCl (Conc.) | Sulphonate |
|---|---|---|---|---|---|---|---|
| | | Grams | Grams | Grams | Grams | Grams | Grams |
| 2a | Para-secondary amylphenol | 172 | 150 | 15 | 45 | 3.5 | 1.5 |
| 3a | Mixed para-tertiary amylphenol and ortho-tertiary amylphenol | 172 | 150 | 15 | 44 | 3.5 | 1.5 |
| 4a | Ortho-tertiary amylphenol | 172 | 150 | 15 | 40 | 3.5 | 1.5 |
| 5a | Para-tertiary hexyl-phenol | 188 | 150 | 20 | 38 | 4.0 | 2.0 |
| 6a | Para-octyl-phenol | 216 | 150 | 25 | 46 | 4.0 | 2.0 |
| 7a | Para-phenyl-phenol | 178 | 150 | 20 | 44 | 4.0 | 2.0 |
| 8a | Para-cyclohexylphenol | 184 | 150 | 20 | 40 | 4.0 | 2.0 |
| 9a | Styrylphenol | 207 | 150 | 25 | 40 | 5.0 | 2.2 |
| 10a | Para-tertiary decylphenol | 245 | 150 | 25 | 40 | 5.0 | 2.2 |
| 11a | Para-tertiary dodecylphenol | 274 | 150 | 28 | 32 | 5.0 | 2.2 |
| 12a | Para-tertiary tetra-decyl-phenol | 315 | 150 | 30 | 50 | 5.5 | 2.3 |
| 13a | Para-tertiary butylphenol | 157 | 150 | 15 | 43 | 3.5 | 1.5 |

It has been suggested also that at temperatures herein employed, for instance, approximately 215° C., or slightly higher, that one may form esters of phenolic hydroxyls. See United States Patent No. 2,485,097, dated October 18, 1949, to Howland and Tewksbury, Jr. Over and above this fact is the fact that at least some formaldehyde (a quarter of a mole or more) enters into the reaction, as previously noted. For this reason, no effort is made to speculate as to the composition, and subsequently, in the claims, the resinous product is described in terms of method of manufacture, for the reason that this appears to be the only adequate method available.

It is to be noted that enough formaldehyde is used to exhaust any functional groups present and susceptible to reaction with formaldehyde under the actual conditions of resinification.

Substantially the same procedure was followed with a number of other difunctional phenols, as shown in the table following. The examples are numbered 2 to 12. These phenols contain 4 to 14 carbon atoms in the substituent hydrocarbon radical. The procedure employed was substantially the same and the conditions substantially the same as in Example 1, preceding. The appearance of the final products was about the same, except that in a general way, the higher the weight of the substituent group, the greater the tendency towards giving a sticky, viscous liquid, rather than a solid material.

The solvent, such as xylene, can be removed from such resin by vacuum distillation at 150° C., or by any other convenient procedure. Such resins, of course, can be treated with oxyalkylating agents, such as ethylene oxide, propylene oxide, glycide, etc., but they may be also converted into valuable derivatives by reaction with other reagents, such as epichlorohydrin or ethylene imine. After reacting with epichlorohydrin the intermediate product thus obtained can be reacted with a tertiary amine, such as pyridine, to give quaternary ammonium compounds which are valuable for various purposes, such as stopping or inhibiting the growth of micro-organic organisms.

Attention is again directed to the fact that the herein described resins are valuable not only for the manufacture of oxyalkylated derivatives, as herein described, but also such resins can be converted into other valuable products. For instance, they can be reacted with epichlorohydrin and then with a tertiary amine, such as pyridine, to give valuable surface-active quaternary compounds. They can be reacted with phenylethylene oxide to give resinous materials of a more complicated nature. The resins can be reacted also with ethylene imine to give amino and polyamino compounds, which, in the form of the acetate, serve as valuable surface-active compounds.

Having thus described our invention, what we claim as new and desire to secure by Letters Patent is:

1. An oxyalkylation-susceptible, fusible, organic solvent-soluble, water-insoluble phenol-isanic acid-formaldehyde resin; said resin being the condensation product of approximately 2 moles of a difunctional phenol, one mole of isanic acid, and one-fourth to one-half mole of formaldehyde; said resin being formed in the substantial absence of phenols of functionality greater than two; said phenol being of the formula:

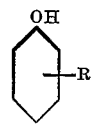

in which R is a hydrocarbon radical having at least 4 and not more than 14 carbon atoms and substituted in one of the positions ortho and para.

2. The resinous material of claim 1, wherein the phenol is para-tertiary amylphenol.

3. The resinous material of claim 1, wherein the phenol is para-octylphenol.

MELVIN DE GROOTE.
BERNHARD KEISER.

No references cited.